(12) United States Patent
Giles et al.

(10) Patent No.: US 8,782,779 B2
(45) Date of Patent: Jul. 15, 2014

(54) SYSTEM AND METHOD FOR ACHIEVING PROTECTED REGION WITHIN COMPUTER SYSTEM

(75) Inventors: Chris M. Giles, Ft. Collins, CO (US); Russ W. Herrell, Ft. Collins, CO (US); John A. Morrison, Ft. Collins, CO (US); Andrew R. Wheeler, Ft. Collins, CO (US); Gerald J. Kaufman, Jr., Ft. Collins, CO (US); Leith L. Johnson, Ft. Collins, CO (US); Daniel Zilavy, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1506 days.

(21) Appl. No.: 11/862,002

(22) Filed: Sep. 26, 2007

(65) Prior Publication Data

US 2009/0083505 A1 Mar. 26, 2009

(51) Int. Cl.
*G06F 21/00* (2013.01)
*G06F 12/14* (2006.01)
*G06F 21/53* (2013.01)
*G06F 12/02* (2006.01)

(52) U.S. Cl.
CPC ........ *G06F 12/1491* (2013.01); *G06F 12/0284* (2013.01); *G06F 21/53* (2013.01)
USPC ...... 726/21; 726/26; 726/27; 718/1; 718/100; 718/104; 719/319

(58) Field of Classification Search
USPC ............... 726/21, 26, 27, 11; 719/319; 718/1, 718/100, 104
See application file for complete search history.

(56) References Cited

U.S. PATENT DOCUMENTS

| | | | |
|---|---|---|---|
| 5,787,095 A | 7/1998 | Myers et al. | |
| 5,842,031 A | 11/1998 | Barker et al. | |
| 6,260,068 B1 * | 7/2001 | Zalewski et al. | ............... 709/226 |
| 6,421,775 B1 | 7/2002 | Brock et al. | |
| 6,457,100 B1 | 9/2002 | Ignatowski et al. | |
| 6,668,308 B2 | 12/2003 | Barroso et al. | |
| 6,671,792 B1 | 12/2003 | McAllister | |
| 6,684,343 B1 | 1/2004 | Bouchier et al. | |
| 6,725,317 B1 | 4/2004 | Bouchier et al. | |
| 6,848,003 B1 | 1/2005 | Arimilli et al. | |
| 6,910,062 B2 | 6/2005 | Arimilli et al. | |

(Continued)

OTHER PUBLICATIONS

Planning Superdome Cofiguration; Building Blocks and Definitions, Glossary, Appendix A, pp. 287-295; Chapter 4, pp. 161-198.

*Primary Examiner* — Christopher Revak
*Assistant Examiner* — Sarah Su

(57) ABSTRACT

A system and method for achieving one or more protected regions within a computer system having multiple partitions are disclosed. In at least some embodiments, the system includes an intermediary device for use within the computer system having the multiple partitions. The intermediary device includes a fabric device, and a first firewall device capable of limiting communication of a signal based upon at least one of a source of the signal and an intended destination of the signal, the first firewall device being at least indirectly coupled to the fabric device. The intermediary device further includes a first conversion device that is one of integrated with the first firewall device and distinct from the first firewall device, and that is capable of converting between a processor address and a fabric address for use by the fabric device. In some embodiments, the various devices each include Control and Status Registers (CSRs).

14 Claims, 2 Drawing Sheets

(56) References Cited

U.S. PATENT DOCUMENTS

| | | | |
|---|---|---|---|
| 6,918,052 B2 | 7/2005 | Bouchier et al. | |
| 6,973,517 B1 | 12/2005 | Golden et al. | |
| 7,299,476 B2 * | 11/2007 | Baudry et al. | 719/312 |
| 7,603,719 B2 * | 10/2009 | Thomas et al. | 726/29 |
| 7,694,304 B2 * | 4/2010 | Kissell | 718/104 |
| 7,793,307 B2 * | 9/2010 | Gokhale et al. | 719/324 |
| 7,856,652 B2 * | 12/2010 | Hieda | 726/1 |
| 7,908,653 B2 * | 3/2011 | Brickell et al. | 726/22 |
| 7,954,150 B2 * | 5/2011 | Croft et al. | 726/21 |
| 2002/0144063 A1 | 10/2002 | Peir et al. | |
| 2003/0009641 A1 | 1/2003 | Arimilli et al. | |
| 2003/0131067 A1 | 7/2003 | Downer et al. | |
| 2003/0158884 A1 * | 8/2003 | Alford, Jr. | 709/104 |
| 2003/0208642 A1 * | 11/2003 | Desai et al. | 710/1 |
| 2004/0268044 A1 | 12/2004 | Heller, Jr. et al. | |
| 2005/0021913 A1 | 1/2005 | Heller, Jr. | |
| 2005/0132365 A1 * | 6/2005 | Madukkarumukumana et al. | 718/1 |
| 2005/0240649 A1 | 10/2005 | Elkington et al. | |
| 2005/0246508 A1 | 11/2005 | Shaw | |
| 2005/0268052 A1 * | 12/2005 | Hepkin et al. | 711/159 |
| 2006/0031672 A1 | 2/2006 | Soltis, Jr. et al. | |
| 2006/0031679 A1 * | 2/2006 | Soltis et al. | 713/182 |
| 2006/0149906 A1 * | 7/2006 | Misra | 711/152 |
| 2007/0005946 A1 * | 1/2007 | Zimmer et al. | 713/1 |
| 2007/0255865 A1 * | 11/2007 | Gaither | 710/36 |
| 2008/0005798 A1 * | 1/2008 | Ross | 726/26 |
| 2008/0016313 A1 * | 1/2008 | Murotake et al. | 711/173 |
| 2008/0222309 A1 * | 9/2008 | Shanbhogue | 709/250 |
| 2009/0313401 A1 * | 12/2009 | Mani et al. | 710/38 |
| 2010/0250877 A1 * | 9/2010 | Gaither et al. | 711/162 |
| 2011/0145412 A1 * | 6/2011 | Ford et al. | 709/226 |

* cited by examiner

SYSTEM AND METHOD FOR ACHIEVING PROTECTED REGION WITHIN COMPUTER SYSTEM

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The present invention relates to computer systems and, more particularly, to computer systems having multiple partitions or sections with which are associated respective resource(s).

BACKGROUND OF THE INVENTION

In the future, many computer systems will have availability, serviceability and manageability requirements that cannot be met by conventional computer systems in which the access to all hardware resources by software and firmware is governed by a single controlling operating system. In particular, many computer systems in the future will need to be able to operate simultaneously as multiple individual computers or partitions, each having its own set of resources. Such computer systems will further require the ability to add, remove or adjust (e.g., swap in and out) various resources over time with respect to the different partitions. Often such computer systems, with their multiple partitions and multiple sets of resources, will employ multiple operating systems with respect to the different partitions/sets of resources.

Although potentially advantageous, such computer systems are at odds with traditional operating systems, since the design of such operating systems presumes that any given operating system is the outright sole owner of the entire computer system on which it is running, with total control over that system. To the extent that such future computer systems employ multiple partitions and sets of resources, each with their own operating systems, such a presumption cannot be maintained. Indeed, to the extent that a future computer system will employ multiple operating systems, such a computer system will often experience conflicts among the different operating systems as those operating systems interfere with each other in governing access to the various resources of the computer system. Further, such a computer system can experience other difficulties, for example, in terms of shifting (or migrating) or replacing hardware resources without taking down or rebooting the computer system. Also, such a computer system can be more difficult to service and maintain in a consistent manner, particularly when its multiple operating systems are updated. Additionally, in some circumstances, a failure in one partition can negatively impact another partition, or a malicious security attack upon a given partition can potentially be launched from another partition.

Existing manners of addressing these issues are insufficient. For example, while it is possible to predetermine and restrict responsibilities of and interactions among different partitions of a computer system by presetting the computer system when it is booted up (prior to operation of the operating systems of the computer system), such pre-configuration often is overly-confining and prevents adjustment of resources after the computer system is fully-operational without rebooting. Also for example, while full software-level machine virtualization can be used to enable shifting (migration) or replacement of hardware resources without having to take down and/or reboot the computer system, and provide enhanced serviceability, such virtualization also can result in lower performance (e.g., in terms of processing speed), and fails to provide electrical isolation.

In still other conventional arrangements, it is possible to implement one or more intermediary "hypervisor" layers or software emulators in between operating systems and the computer hardware of a computer system, and to configure those layers/emulators in a manner that effectively prevents operating system conflict. Yet such layers/emulators also are disadvantageous in certain respects. To begin with, such layers/emulators typically require a port or revision to support each new OS. Additionally, if such layers/emulators fail, this can result in Multi-Partition Single Points of Failure (MP-SPOFs) in which all of the partitions running under that software will also fail. Further the use of such layers/emulators still may not be compatible with maintaining the security of one partition relative to another partition. Additionally, interfacing between the operating systems (and applications performed via those operating systems) and the computer resources may proceed in a less efficient manner due to the presence of the layers/emulators.

For at least the above reasons, therefore, it would be advantageous if an improved system and method could be developed by which, in at least some embodiments, multiple partitions of a computer system having multiple sets of resources could simultaneously operate in a manner that substantially avoided conflicts among the different partitions (and particularly avoided conflicts among different operating systems associated with those different partitions). It would be further advantageous if, in at least some embodiments, such a new system and method allowed for relatively easy shifting, migration, and/or replacement of hardware components, without rebooting. Additionally, in at least some embodiments, it would be advantageous if such a new system and method allowed for such multiple partitions to be operated simultaneously, in a manner providing electrical isolation between components of the partitions, such that a failure within one partition did not necessarily negatively impact operation of other partition(s), and such that the occurrence of MP-SPOFs could be avoided. Also, in at least some embodiments, it would be advantageous if such a new system and method allowed for the partitions to be operated simultaneously in a manner such that a security attack upon a given partition of the computer system could not be easily launched from another partition of the computer system. Additionally, it would be advantageous if such a new system and method, in contrast to conventional hypervisor layers or emulators, automatically supported all of the operating systems running natively on the computer system (including new operating systems).

SUMMARY OF THE INVENTION

In at least some embodiments, the present invention relates to a computer system. The computer system includes a first partition having a first processing device, where a first operating system operates in relation to the first partition, and a second partition having a second processing device, where a second operating system operates in relation to the second partition. The computer system further includes a layer coupled to and capable of communicating with each of the first and second partitions. Access by at least one of the first and second operating systems to at least a portion of the layer is restricted at least in part, and the layer has access to the first and second processing devices.

Additionally, the present invention in at least some embodiments relates to a computer system. The computer system includes a first partition and a second partition, where the first partition has a first processing device, and where a first operating system operates in relation to the first partition. The computer system also includes a first intermediary device at least indirectly coupled to the second partition, and a second intermediary device at least indirectly coupling the first partition with the first intermediary device. The second intermediary device is capable of making a determination that a first signal at least one of originated at a source other than the first partition and is intended for a destination other than the first partition. Also, the second intermediary device serves to prevent the first signal from proceeding at least one of toward and away from the first partition upon making the determination.

Further, in at least some embodiments the present invention relates to an intermediary device for use within a computer system having multiple partitions. The intermediary device includes a fabric device, and a first firewall device capable of limiting communication of a signal based upon at least one of a source of the signal and an intended destination of the signal, the first firewall device being at least indirectly coupled to the fabric device. The intermediary device further includes a first conversion device that is one of integrated with the first firewall device and distinct from the first firewall device, and that is capable of converting between a processor address and a fabric address for use by the fabric device.

Additionally, in at least some embodiments the present invention relates to a method of operating a computer system having multiple partitions, upon which run respective operating systems. The method includes receiving a signal from a source device associated with a first of the partitions, and verifying at least one of whether the signal is from a desired source partition and whether the signal is intended for a desired destination partition. The method also includes routing the signal to a destination device associated with at least one of the first partition and a second of the partitions.

DETAILED DESCRIPTION OF THE PREFERRED EMBODIMENT

Figure 1:
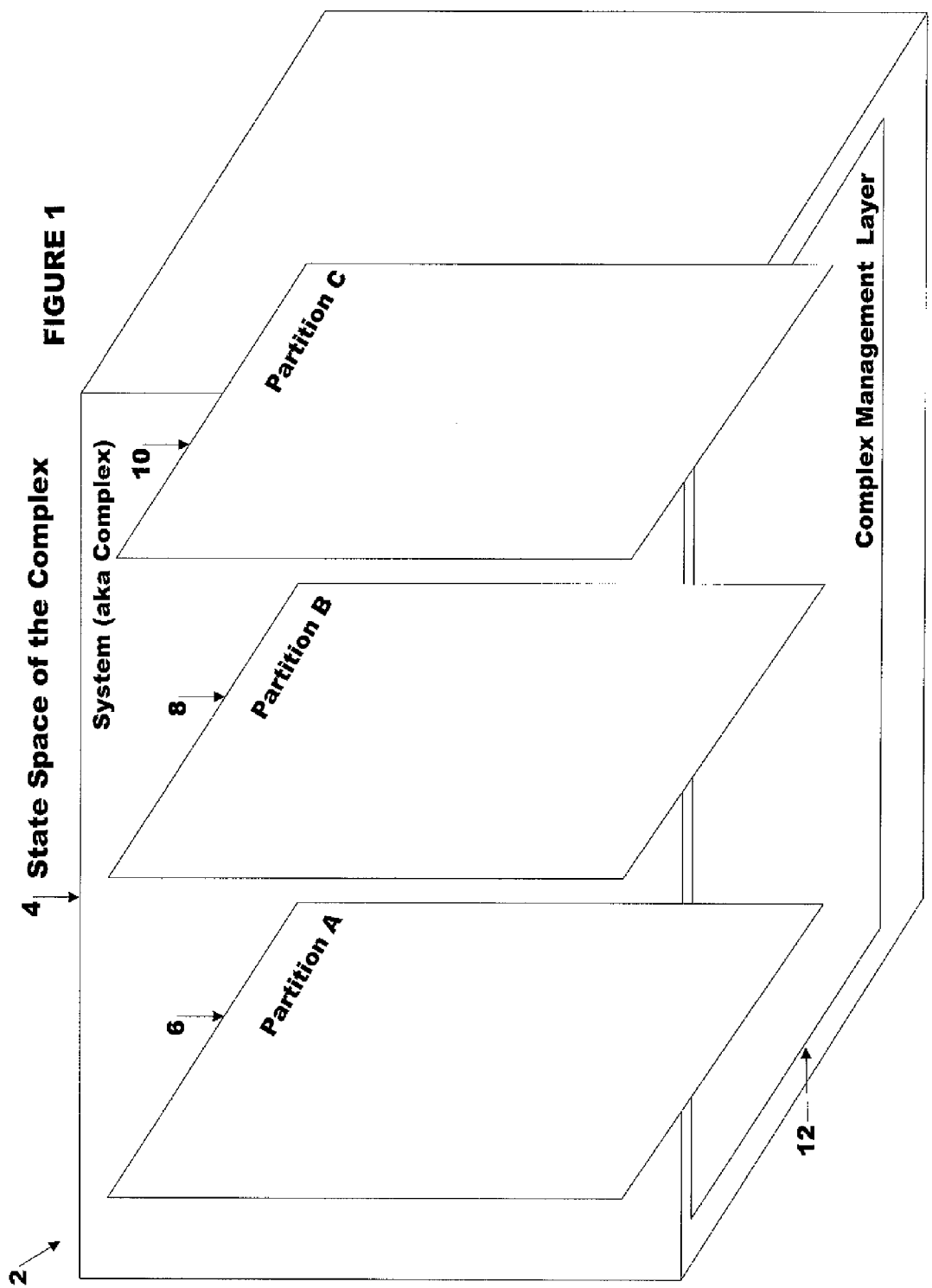
FIG. 1 illustrates in a figurative manner components of a computer system divided into multiple partitions and also including a complex management layer, in accordance with one embodiment of the present invention.

Referring to FIG. 1, components of an exemplary multi-processor computer system 2 existing within an overall framework or state space 4 are shown in a simplified schematic form, in accordance with at least one embodiment of the present invention. The state space 4 is a combination of hardware and firmware, on which can also operate software. As shown, in the present embodiment the state space 4 is divided into first, second and third partitions 6, 8 and 10, respectively (represented by respective vertical planes), and a complex management layer (CML) 12 (represented by a single horizontal plane or "floor"). As will be discussed further below, in the present embodiment each of the partitions 6, 8, and 10 is configured by, managed by and isolated from the other partitions by the CML 12. In the present embodiment, the computer system 2 (and state space 4) can be an sx1000 super scalable processor chipset available from the Hewlett-Packard Company of Palo Alto, Calif., on which are deployed hard partitions forming the partitions 6-10 (also known as "nPars"). Although the computer system 2 (and state space 4) can be the super scalable processor chipset mentioned above, it need not be such a chipset and instead in other embodiments can also take a variety of other forms.

With respect to the partitions 6-10 (which can collectively be referred to as a "complex"), in the present embodiment, each partition includes multiple integrated circuit (IC) chips, formed on one or more printed circuit board(s), modules, cells or blades that can be plugged into a backplane on which can be formed the CML 12. The partitions 6-10 are capable of operating independently of one another, by way of different types of operating systems (e.g., HP-UX, Linux, Microsoft Windows Server 2003, OpenVMS) or, if two or more of the partitions utilize the same type of operating system, different instances of the same operating system. The partitions 6-10, by way of their operating systems, are capable of operating completely or substantially independently, and are capable of simultaneously executing a wide variety of applications. Although the computer system 2 (and state space 4) of the present embodiment includes only the first, second and third partitions 6, 8 and 10, respectively, it is nevertheless intended to be representative of a wide variety of computer systems having an arbitrary number of partitions and/or circuit boards within the state space 4. For example, other embodiments can have only a single partition or possibly more than three partitions as well. Additionally, each of the partitions 6-10 can be formed of Application Specific Integrated Circuit (ASIC) chips, Very Large Scale Integration (VLSI) chips and/or Field Programmable Gate Array (FPGA) chips.

Although not shown in detail in FIG. 1, it should be understood that the state space 4 with its partitions 6-10 and CML 12 can include a variety of resources including, for example, processors or controllers (e.g., central processing units (CPUs) such as microprocessors), memory controllers, memory blocks or other memory devices, input/output (I/O) devices, and other resources. Almost all of the resources in the state space 4 are available or "visible" to the CML 12, that is, the CML is capable of controlling, monitoring or otherwise accessing almost all of the resources of the state space. In contrast, only a respective subset of the total resources within the state space 4 is assigned to each of the respective partitions 6-10, such that the respective partition (particularly its operating system) is able to monitor, control and/or otherwise access those resources, and such that those resources are available or visible to the respective partition (operating system). The particular subset of the total resources that is available to any given one of the partitions 6-10 can be considered as residing on the vertical plane FIG. 1 corresponding to that partition.

In the present embodiment, the assignment of many if not all of the resources to the different partitions 6-10 and CML 12 is flexible and adjustable. For example, although at any given time various resources of the computer system 2 (and state space 4) are assigned to the various partitions 6-10, it is also possible for many if not all of the resources to be reassigned or reallocated to different ones of the partitions. Further, as new resources are added to the computer system 2 (and state space 4) or removed, those resources can be assigned to particular ones of the partitions 6-10 or deleted from ones of the partitions. The partitions 6-10 in particular are configured to allow the resources of the computer system 2 (and state space 4) to be dynamically reallocated as the different resources become desirable or necessary (or are not needed) to accomplish various applications or tasks. In some cases, resources can be divided or shared among multiple enterprise workloads.

With respect to the CML 12, it is a combination of hardware and firmware (and software executed thereby) serving several purposes within the computer system 2. In particular, the CML 12 serves to provide a privileged level (discussed in more detail below) within the state space 4 by which certain operations can be carried out without the knowledge of any of the operating systems of the partitions 6-10. In providing this privileged level, the CML 12 includes certain special resources that are discussed in further detail below and that include, for example, configuration and status resources, for identifying, configuring and isolating the partitions 6-10 from one another. Isolation between different partitions is desirable since as it allows the different partitions to operate independently and to execute different or identical (e.g., different instances of the same) software programming simultaneously. Further, by isolating the different partitions, any hardware or software failure affecting a given partition need not affect any of the other partitions (also, any failure of the CML 12 also need not affect any partition).

Relatedly, the CML 12 also enables the shifting of resources among the partitions 6-10. More particularly, the CML 12 is configured to enable the reallocation and reassignment of resources among the partitions 6-10 in a manner that is transparent or invisible to the operating systems of the respective partitions—that is, so that the operating systems remain oblivious to the shifting of resources. Typically, the CML 12 and the partitions 6-10 execute on the same resources (e.g., over the fabric). However, to facilitate such movement of resources in a manner unknown to the operating systems, the CML 12 includes certain special resources that are described in more detail below and that allow for on-line replacement, addition and deletion of the resources from the partitions 6-10. Further, the CML 12 is also responsible for controlling all electronics initialization sequences, as well as transaction routing resources within the state space 4. Also, in addition to the above-described tasks, the CML 12 can be programmed to perform other tasks depending upon various factors including, for example, the specific type and needs of the computer system 2 and the requirements of the applications running on the partitions 6-10.

To accomplish the above-discussed purposes, a privileged level/state or a complex management (CM) mode is created within the CML 12 by assigning to the CML a special set of dedicated resources that are invisible to the operating systems running on the partitions 6-10, and that can be considered to reside on the horizontal plane/floor of FIG. 1. In addition to the dedicated resources, the CML 12 can also include a set of non-dedicated resources that are in fact visible to the operating systems and are capable of being accessed by both the CML and the operating systems. The dedicated resources of the CML 12 are kept invisible from the operating systems of the partitions 6-10 by way of trusted CM-enabled software/firmware running on dedicated management processors within the CML 12 at all times as part of the CM mode. In addition to running on dedicated management processors, some of the trusted CM-enabled software/firmware can also be executed on system processors, which are shared between the CML 12 and the operating system/application tasks.

The trustworthiness of the code running within the CML 12 is established particularly insofar as the code is executed on protected regions of the complex management hardware (e.g., a processor) of the CML 12 that is dedicated to running the CM code, and that is not available to the operating systems of the partitions 6-10. In addition to the CM code running on the CML 12, additional CM-enabled programs are provided by the CML 12 to the partitions 6-10. These programs, upon being executed by the partitions 6-10, in turn allow the CML 12 to configure or maintain the partitions, proactively react to failures, migrate processes to new processors without modifying the operating systems, and perform other tasks, at least some of which require isolation from the operating systems of the partitions.

As will be discussed below in further detail with respect to FIG. 2, the various resources of the state space 4 can be understood as being divided into two categories based upon the accessibility of those resources, namely, a first "protected" category and a second "unprotected" category. This differentiation between "protected" and "unprotected" resources of the state space 4 is enforced in hardware. With respect to the first "protected" category, this includes any resources that, although capable of being accessed by both the CML 12 and the operating systems, are nevertheless not responsible for formulating useful, accurate responses when accessed by the operating systems in particular. That is, such protected resources return useful information only on the CML accesses and return useless or "garbage" values on operating system accesses. Further, protected resources can be modified only by the CML 12, and typically can be modified without any effects upon the operating systems of the partitions 6-10 and without any stalling of any applications executing on the partitions. As will be described further below, such protected resources can include, for example, source and destination firewalls, memory controller configurations, memory interleave tables, hardware abstraction tables, hardware error logs, transaction routing resources, and other resources required for monitoring, identifying and isolating the partitions 6-10.

By comparison, the second "unprotected" category includes resources that are not only accessible by both the CML 12 and the operating systems running on the partitions 6-10, but also are responsible for providing accurate responses to both the CML 12 and the operating systems upon being accessed. In particular, the operating systems in addition to monitoring also have the capability of controlling and modifying these unprotected resources, in contrast to the protected resources. As will be described further below, such unprotected resources can include, for example, processing devices, input/output (I/O) devices and memory blocks, among other devices.

It should be noted that, by providing isolation between the operating systems, providing isolation between the operating systems and the CML 12, and differentiating between protected and unprotected resources, the above-described embodiment of the present invention provides various advantages relative to conventional embodiments of computer systems, particularly in terms of improving the availability, serviceability and manageability of the resources within the computer system 2 (and state space 4). For example, the present embodiment allows for the on-line installation and/or switching of resources of the computer system 2 without rebooting of the computer system. Also for example, the present embodiment allows applications to be run on different operating systems and different partitions of the same computer system 2 in an operating system-agnostic manner, without MP-SPOFs, as well as without concern that there will be unwanted communication or cross-contamination between those different applications/operating systems.

Figure 2:
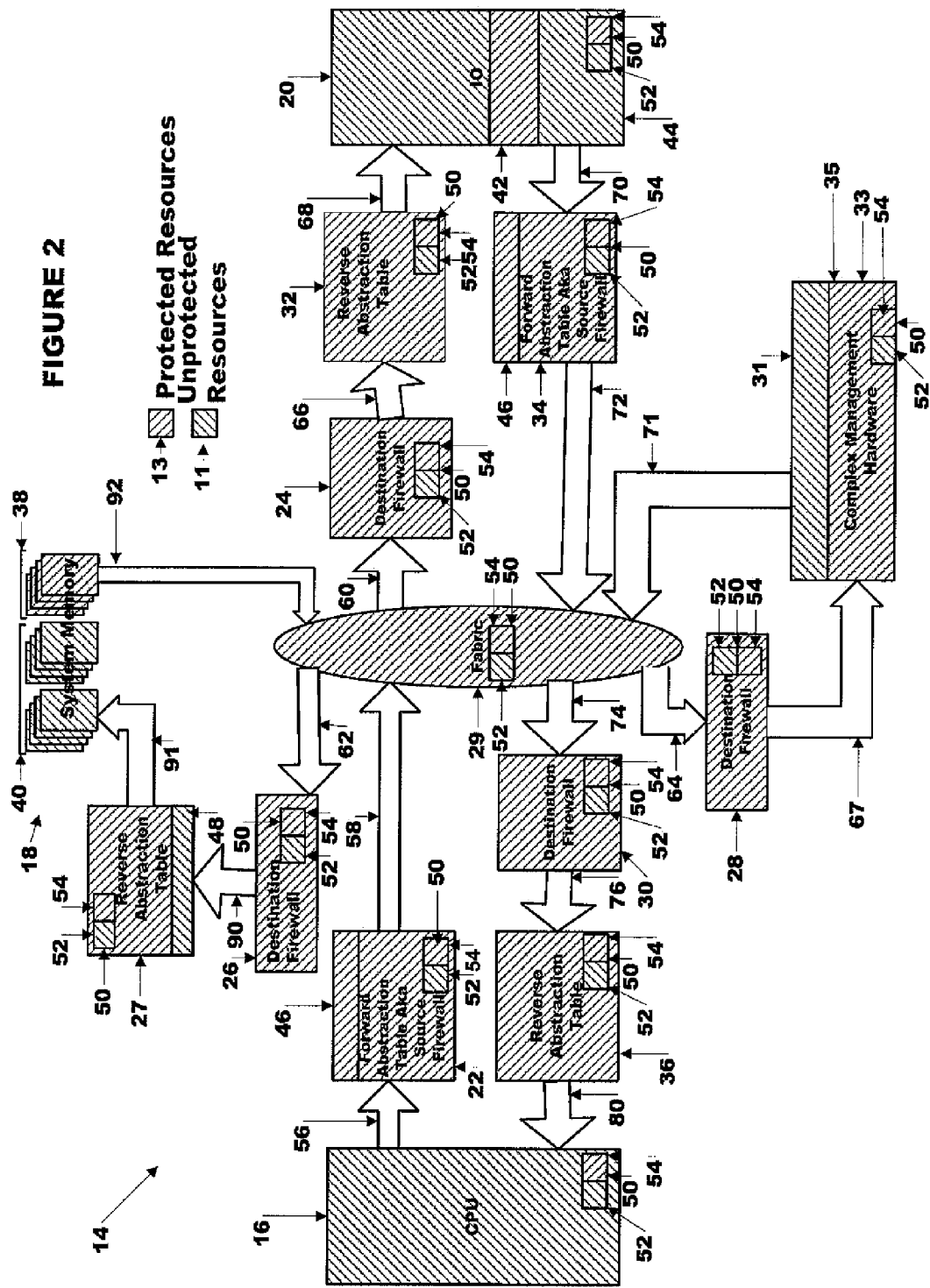
FIG. 2 shows in schematic form how various components of the computer system of FIG. 1 communicate with one another, in accordance with one embodiment of the present invention.

Turning to FIG. 2, an exemplary block diagram 14 shows in more detail various exemplary unprotected resources 11 and exemplary protected resources 13 of the state space 4 of the computer system 2 in a simplified, schematic form corresponding to at least one embodiment of the present invention, along with exemplary communication paths among those resources. As discussed in further detail below, communications among the various unprotected resources 11 (e.g., when those unprotected resources are on different ones of the partitions 6-10), as well as communications between the unprotected resources and protected resources 13, are restricted by virtue of the protected resources. By restricting such communications, the present embodiment provides a protection architecture that safeguards and segregates the partitions 6-10 of the computer system 2 from one another and from the CML 12, and also enables the CML 12 to manage and configure the operation of the computer system 2 independently of (and without inappropriate knowledge, contamination or other involvement by) the operating systems running on those partitions.

As further shown in FIG. 2, in the present embodiment, the unprotected resources 11 (marked by cross-hatched lines in a southwest-to-northeast direction in FIG. 2) include a central processing unit (CPU) 16 owned by an operating system (although the CPU can also be owned the CML 12), portions 40 of a system memory 18 and portions 44 of an I/O system 20, albeit in other embodiments other or additional unprotected resources can also be present. As for the protected resources 13 (marked by cross-hatched lines in a northwest-to-southeast direction), these also include portions 38 of the system memory 18, portions 42 of the I/O system 20, as well as portions of complex management hardware 33 existing as part of the CML 12. Further, in the present embodiment, the above-mentioned unprotected resources 11 are shown to be in communication with one another by way of several more of the protected resources 13. These additional protected resources 13 include forward abstraction tables 22 and 34, which also serve as source firewalls, destination firewalls 24, 26, 28, 30, reverse abstraction tables 27, 32 and 36, and a fabric 29, all of which serve as intermediaries between the above-mentioned CPU 16, system memory 18, I/O system 20 and complex management hardware 33. Further as shown in FIG. 2, all of the above-mentioned protected resources 13 and unprotected resources 11 (except for the system memory 18) include respective Control and Status Registers (CSRs) 50, which are described in further detail below.

More particularly with respect to the CPU 16, that processing device can be understood to be assigned to one of the partitions 6-10 and includes various hardware and software components capable of supporting an operating system and/or a wide variety of applications, and/or performing tasks relating to the management of the hardware and software components of the CPU. In the present embodiment, the CPU 16 is an Itanium processing unit as is available from the Intel Corporation of Santa Clara, Calif. In other embodiments, the CPU 16 can be another type of CPU including, for example, the Xeon or Celeron processors also available from the Intel Corporation. In further alternate embodiments, the CPU 16 can be another type of CPU other than those mentioned above including a wide variety of processing units available from the Advanced Micro Devices (AMD) of Sunnyvale, Calif. Although FIG. 2 only shows the single CPU 16, it will be understood that each of the partitions 6-10 can have any arbitrary number of CPUs of any number of types, not merely a single CPU. Indeed, in at least some embodiments, one or more of the partitions 6-10 will include one or more sockets, each of which can include one or more CPUs.

The CPU 16 of the present embodiment is often one of the unprotected resources 11 owned by the operating system(s), although the CPU 16 can also be a protected resource that is owned by the CML 12 and is invisible to the operating systems. In contrast, at least some portions of the complex management hardware resources 33 are strictly among the protected resources 13 and owned by the CML 12. Such complex management hardware resources 33 in particular can include a variety of processing devices, memory devices, I/O devices or other hardware devices (and related firmware and/or software) that are implemented as part of the CML 12, and distributed throughout the computer system 2 (for e.g., cell boards, I/O trays and management processor boards plugged into the computer system). As hardware sources that are specially configured for use by the CML 12, these protected portions of the complex management hardware resources 33 can only be accessed and/or controlled by the CML or CM-enabled processes.

With respect to the system memory 18, it is divided into multiple disjointed memory segments. In at least some embodiments, the memory segments are organized as dual in-line memory modules (DIMMs). The system memory 18 can be a local memory hanging off of the CPU 16 or it can be a global shared memory existing on the same and/or different partitions as the CPU 16. As mentioned above, the memory segments of the system memory 18 are divided into protected memory segments such as the portions 38, which can be accessed and controlled only by the CML 12 and/or CM-enabled processes, and unprotected memory segments such as the portions 40, which can be accessed and controlled not only by the CML but also by any other process, including one or more than one of the operating systems associated with the different partitions 6-10. The particular manner in which the system memory 18 is subdivided into memory segments, and particularly into protected and unprotected memory segments, can vary depending upon the embodiment and upon various factors, for example, the requirements of the applications running on the partitions 6-10 or possibly the requirements of the CML 12.

As for the I/O system 20, it can include input devices such as a keyboard, a computer mouse, a joystick or any other device used to enter information into the computer system 2, and/or one or more output devices such as a monitor, a touch-screen, a printer, a projector or any other device used to present information from the computer system 2 to the user or to otherwise output information, and/or any other hardware device that can be directly or indirectly coupled to the computer system 2 (including, for example, one or more devices for interfacing/connecting to one or more wired or wireless networks). As mentioned above, the I/O system 20 includes both protected I/O device(s) such as the portions 42, which can only be accessed and controlled by the CML 12 and/or CM-enabled processes, and unprotected I/O device(s) such as the portions 44, which can be accessed and controlled not only by the CML but also by any CM-enabled processes including one or more of the operating systems associated with the different partitions 6-10. The I/O system 20 can either hang off of the CPU 16 or be connected to (or attached by way of) any of the partitions 6-10, and the manner of sub-division of the I/O system 20 into the protected and unprotected portions 42, 44 can vary depending upon the embodiment.

With respect to the fabric 29, this resource is a protected hardware device that can be formed as part of (or connected to) the backplane of the computer system 2. Each of the partitions 6-10 is connected to the fabric 29 during configuration when those partitions are installed on the computer system 2. Further, the fabric 29 serves as a global intermediary for communications among other resources of the computer system 2 during operation of the computer system. In particular, all requests by the CPU 16 (or any other CPUs) to access any of the memory segments of the system memory 18 or any of the I/O devices of the I/O system 20 are directed through the fabric 29. This is true irrespective of the category of the memory segment or I/O device, e.g., whether it is protected or unprotected. Also, this is true irrespective of the location of the memory segment or I/O device relative to the CPU 16, e.g., whether both the CPU and the memory segment or I/O device are on the same one of the partitions 6-10 or not. Similarly, all other communications between or among the I/O system 20, the system memory 18 and the CPU 16, as well as communications between or among those components and the complex management hardware resources 33 or other memory-mapped configuration devices (e.g., the CSRs 50), occur by way of the fabric 29, regardless of the whether one or more of these components are protected or unprotected, or associated with the same partitions or not.

In order for signals provided to the fabric 29 from the CPU 16, the I/O system 20, and the CSRs 50 to be properly communicated via the fabric to their intended destinations, in the present embodiment, the signals must take on fabric (or global) addresses that differ from the processor addresses employed by the signals when outside of the fabric. The CSR 50 of the fabric 29 includes routing tables/mappings for all possible destinations of requests such that, upon being provided with signals including such fabric addresses, the fabric is able to perform the appropriate routing of the signals within the fabric to the appropriate destinations along the fabric. Once the fabric 29 has communicated the signals to their appropriate destinations on the fabric, fabric addresses must then be converted back to the appropriate processor addresses. In some cases, it is possible that the resulting processor addresses provided by the fabric upon re-conversion from the fabric addresses may differ from the original processor addresses that were converted into the fabric addresses.

The conversion of processor addresses to fabric addresses and vice-versa is performed by the forward abstraction tables 22 and 34 and the reverse abstraction tables 27, 32 and 36, which are special hardware devices that, as noted above, are among the protected resources 13. The forward abstraction tables 22 and 34 in particular serve to convert processor addresses to fabric addresses in response to requests from the CPU 16 and the I/O system 20, to the CPU, the I/O system, the complex management hardware resources 33, the system memory 18, and the configuration resources (such as the CSRs 50), respectively. The forward abstraction tables 22 and 34 also have protected memory regions 46, which are accessible only to the CML 12. In contrast, the reverse abstraction tables 27, 32 and 36 provide translation from fabric addresses to processor addresses in relation to the communication of signals being communicated from the fabric 29 to the system memory 18, the complex management hardware resources 33, the I/O system 20, the CPU 16, and some of the memory-mapped CSRs, respectively. Again, the reverse abstraction table 27 has a protected memory region 48, which is accessible only to the CML 12.

More particularly as shown, each of the forward abstraction tables 22 and 34, and the reverse abstraction tables 27, 32 and 36, includes a respective set of CSRs 50, on which are programmed the respective conversion or mapping algorithms (or look-up tables) by which processor addresses are to be converted into fabric addresses, or vice-versa. Thus, upon receiving requests (or commands or some other addressed signals) from the CPU 16 and the I/O system 20, respectively, the respective forward abstraction tables 22 and 34 search through their respective pre-programmed mapping tables to determine the corresponding fabric addresses. Also, upon receiving signals with fabric addresses from the fabric 29 that are intended for the system memory 18, the I/O system 20 and the CPU 16, respectively, the respective reverse abstraction tables 27, 32 and 36 search through their respective pre-programmed mapping tables to determine the corresponding processor addresses. Once the forward/reverse abstraction tables identify the appropriate fabric/processor addresses, the tables then pass the incoming signals on with the appropriate converted address information. It should be further noted that there is no abstraction for the complex management hardware since, by definition, this lives outside of the operating system (not in the partition but instead in the fabric domain).

In addition to the forward abstraction tables existing in between the fabric 29 and the complex management hardware resources 33, and the respective forward and reverse abstraction tables 36, 32 and 27 existing in between the fabric 29 and the CPU 16, the I/O system 20, and the system memory 18 respectively, in the present embodiment source and destination firewalls additionally exist that serve to protect against inappropriate signals being communicated with the computer system 2, particularly between the operating systems associated with different ones of the partitions 6-10, or between devices dedicated to the different partitions, or between the operating systems of the partitions and the CML 12, or between devices dedicated to the partitions and the CML 12. By operating in this manner, the firewalls serve to maintain security and provide isolation between the partitions 6-10 running concurrently in the computer system 2 of FIG. 1 and sharing the fabric 29. More particularly, as mentioned above, the source firewalls in the present embodiment are formed by (and are identical to) the forward abstraction tables 22 and 34. In contrast, the destination firewalls 24, 26, 28 and 30 are distinct from the reverse abstraction tables 32, 27 and 36, and are shown to be coupled in between the fabric 29 and the reverse abstraction tables except for the destination firewall 28, which directly receives information from the fabric 29. The firewalls in the present embodiment are implemented by way of hardware.

In the present embodiment, the source firewalls formed by the forward abstraction tables 22, and 34 generally operate to prevent the passage of signals not going to an expected one of the partitions 6-10. For example, upon a signal being provided from the CPU 16, the source firewall indexes the processor address of the CPU into a routing table to assign to the signal a destination ID, which identifies the partition and/or resource receiving the signal. The absence of a corresponding destination ID for the processor address in the routing table results in a translation miss indicating that the signal is routed to an unexpected destination and the signal is not allowed to pass through. Processor addresses successfully assigned a destination ID are then translated into a fabric address by the forward abstraction table 22 and routed to the fabric 29. (It should further be noted that, in at least some embodiments, a given CPU can include a socket that contains multiple cores and threads that can serve multiple partitions at once, one per core.) Likewise, the forward abstraction table 34 in conjunction with the source firewall serves to prevent the passage of signals coming from the I/O system 20 and destined to ones of the partitions 6-10, if that partition is not associated with what is expected by the source firewall. The forward abstraction tables 22 and 34, by virtue of their processes of converting processor addresses to fabric addresses, also provide some additional security by mapping non-unique processor addresses into unique fabric addresses.

The source firewalls formed by the forward abstraction tables 22 and 34 generally operate upon every single signal packet that is provided to those firewalls. In order to determine whether a given signal is going to an appropriate ones of the partitions 6-10, the respective forward abstraction tables/source firewalls consult their respective CSRs 50 to determine whether the processor address associated with that signal is within the partition's disjointed portion of the address space within the complete system address map stored within the firewall's CSRs. Although in the present embodiment the source firewalls are formed by the forward abstraction tables, in alternate embodiments, the source firewalls can exist as independent components as well.

Although the source firewalls provided by the forward abstraction tables 22 and 34 are a robust and dependable mechanism to provide isolation between partitions, extra security and protection against possibly malicious attacks upon the partition, and/or hardware failures, is provided by the destination firewalls 24, 26, 28 and 30. In contrast to the source firewalls, the destination firewalls 24, 26, 28 and 30 review every packet that is received from the fabric 29, in a manner similar to that of the source firewalls (e.g., involving consultation of the CSRs 50 of the destination firewalls and indexing into a routing table), to ensure that the source of the packet is actually an appropriate one of the partitions 6-10 or a hardware resource associated with that particular one of the partitions. Typically (although not necessarily), the destination partition must match the source partition. For example, the CPU 16 is associated with the partition 6 and sends a signal intended for receipt by the I/O system 20, the destination firewall 24 will only allow the signal to pass to the I/O system 20 if that system is also associated with the partition 6. In this manner, partition containment is enforced, so as to result in partition isolation.

Notwithstanding the above description, in alternate embodiments, other manners of operation by the firewalls are also possible. For example, in some alternate embodiments, the destination firewalls can operate so as to require that all requests passing through the firewalls belong to the same partitions as the sources of those requests except in special cases such as global memory accesses, in which case the requests are nevertheless allowed to cross partition boundaries. Also, in further alternate embodiments, cross-partitioning requests can also be allowed by the source firewalls, depending upon the needs and types of the computer systems and the applications running on such computer systems. For example, the firewalls can be programmed to allow global memory traffic to be routed across partition boundaries to enable higher memory interleaving, or if the firewalls have been programmed specifically to allow such requests for some other reason.

From the above description, it should be apparent that the CSRs 50 residing with each of the components of the computer system 2/state space 4 (excepting the system memory 18) can store a variety of types of information. Typically, each of the CSRs 50 is a series of flip-flops that are accessible by the component within which the CSR resides by way of a bus. In the present embodiment, all of the CSRs 50 within the respective components assigned within a given one of the partitions 6-10 are connected to each other in a daisy chain fashion enabling communication between those CSRs in the partition. In addition to the above-described purposes of the CSRs, the CSRs 50 can be utilized for a variety of other purposes including, for example, to determine whether certain operations should be performed, to achieve configuration of the partitions 6-10 or check the status of the various applications executing within those partitions. Among these various purposes, one significant purpose of the CSRs 50 in the present embodiment is to assist in maintaining partition segregation and otherwise protecting unauthorized or otherwise inappropriate communications to occur among the different partitions 6-10 and/or between the partitions and the CML 12.

To that end, as indicated in FIG. 2, each of the CSRs 50 includes a first, unprotected portion 52 that is one of the unprotected resources 11, and also a second, protected portion 54 that is one of the protected resources 13. Typically, each of the CSRs 50, including both the protected and unprotected portions 52 and 54 of the respective CSR, can be accessed at any time by the respective component to which that CSR belongs, in order to determine the state of the respective component, address mapping information and/or possibly other information (e.g., global shared memory and debug and performance resources). For example, the CSR 50 of the CPU 16 can be accessed by an operating system running on that CPU at any time. In contrast, other components including the same operating system, software or firmware running at various privilege levels within the computer system 2 can only access protected or unprotected portions of the CSR 50 to the extent that the source of the request has privileged (e.g., CM-enabled) access. Privileged information stored within the protected portions 54 of the CSRs 50 can include error log information, configuration information or anything else that is not appropriate for access by an operating system. It should further be noted that a CSR 50 is never "consulted" by its host block in a way that one might expect of firmware or software. Rather, the values in the CSR are used in a hardware manner to control various functions, even though firmware and software do consult the CSRs and are subject to the protected and unprotected views (that is, it is the firmware or software running at various privilege levels that cannot access the data, unless the particular firmware/software has the right privilege level).

Among the information included within at least some (if not all) of the CSRs 50 is a complete system address map containing addresses of components within the computer system 2 (and state space 4), which can be used for various purposes including, as discussed above, conducting communications among the various components by way of the fabric 29. For each respective CSR 50, the present embodiment includes both, a first unprivileged address at which the CSR can be accessed, and a second privileged address. The unprivileged address of each respective CSR 50, when accessed, results in a data access within the respective unprotected portion 52 of the respective CSR, while the privileged address of each respective CSR, when accessed, results in a data access within the respective protected portion 54 of the respective CSR. Although not identical, the addresses of the unprivileged and privileged portions 52, 54 of each given CSR are related insofar as each address entry within the unprivileged CSR address regions has a corresponding address entry within the privileged CSR address regions. That is, the respective unprivileged and privileged portions 52, 54 constitute two sets of aliases for the same addresses. More particularly, in at least some embodiments, each address in the system map is mapped twice within each CSR 50, once in the unprotected portion 52 and a second time in the protected portion 54, with privilege being determined by the bits in the address of the request.

The unprivileged and privileged portions 52, 54 of the CSRs 50, and particularly the privileged and unprivileged address maps of the CSRs, enable the respective components within which the CSRs are implemented to determine whether to allow access to information or take other actions in response to requests/commands received from other components. More particularly, each component is able to determine based upon its own CSR 50 as to whether it is one of the protected resources 13 or one of the unprotected resources 11. Also, each component, by virtue of the receipt of a transaction with use of a privileged address space that can only be used if the source has transitioned through the root of a chain of trust is able to determine the protected or unprotected status of any source of a given request/command. Therefore, upon receiving a request/command from another component, a given component can determine whether the request/command is from a protected or unprotected resource and then further, based upon whether the given component is a protected or unprotected resource, determine whether or not to honor the request/command or otherwise determine how to respond to the request/command.

By virtue of the above-described intermediaries (namely, the fabric, the forward and reverse abstraction tables, and the source and destination firewalls), as well as the operation of the CSRs 50, the computer system 2/state space 4 achieves a protection architecture allowing for several types of operational protection. First, by virtue of the intermediaries, protected routing traffic is enforced to make sure that traffic is routed to the correct places and/or prevented from being routed to incorrect places. Further, because of these components, when errors or malfunctions occur, the errors/malfunctions are contained within a given partition without hampering any other partition in the computer system 2/state space 4. Additionally, by virtue of the CSRs 50, components within the computer system 2/state space 4 are able to automatically determine whether it is appropriate to respond to signals and/or, if so, how to respond to those signals.

In addition to illustrating exemplary components of the computer system 2/state space 4, FIG. 2 is also intended to illustrate exemplary communication flow patterns among these various components, several of which are discussed in more detail below. More particularly, as shown in FIG. 2, requests can be made by the CPU 16 to access the system memory 18, the IO system 20, or the complex management hardware resources 33. In the present example, it is assumed that the CPU 16 is associated with the partition 6, although in other examples the CPU could be associated with another of the partitions 8-10 or some other partition. In order to contact these resources, the CPU 16 provides request signals to the forward abstraction table/source firewall 22 as indicated by an arrow 56. The request signals include processor addresses of desired destinations, e.g., processor addresses representative of the particular memory segments, I/O devices, hardware resources, or other devices/resources of interest to the CPU.

In response to receiving the request signals, the forward abstraction table/source firewall 22 as discussed above determines whether the request signals are destined to a desired partition, and in this example particularly determine whether the request signals are going to the partition 6, which in this example is true. When requests for valid resources are received, appropriate mappings then take place. However, the source firewalls guard against inappropriate or illegal requests routed to a partition other than the expected destination partition. In particular, if the source firewall determines that an illegitimate request has occurred (e.g., a request from outside the expected partition, or a request for a memory block not used by the present partition), the request will be blocked.

Subsequently, the forward abstraction table/source firewall 22 further converts the processor addresses provided as part of the request signals from the CPU 16 into fabric addresses suitable for use by the fabric 29. This conversion is achieved by the forward abstraction table 22 in consultation with its CSR 50, which includes the complete system address map. The request signals, as modified to include the fabric addresses, are then provided to one or more ports of the fabric 29, as indicated by an arrow 58. In turn, the fabric 29 through the use of its routing tables/mappings within its CSR 50 is able to determine appropriate routing of the signals within the fabric toward appropriate ports of the fabric that are indirectly (by way of the destination firewalls and reverse abstraction tables) routed to the desired destinations. It should be further noted that the fabric 29, upon receiving requests from the forward abstraction table/source firewall 22, can route requests in various manners depending upon the type of the transaction requested. For example, in at some embodiments, a request can be directed to multiple destinations simultaneously.

Depending upon whether the original request signals from the CPU 16 are intended for the system memory 18, the I/O system 20 or the complex management hardware resources 33, respectively, the fabric 29 then forwards the request signals to the destination firewalls 26, 24, or 28, respectively, as indicated by arrows 62, 60 or 64, respectively. When the request signals arrive at the destination firewalls 26, 24 or 28, the destination firewalls ensure that the request signals are indeed from a particular set of resources forming a partition or a domain (e.g., a collection of partitions). In the present example, the complex management hardware resources 33 in particular are part of a particular partition such as the partition 6, and consequently the destination firewalls 28 existing between those resources and the fabric 29 expects signals transmitted thereto from the fabric 29 to be coming from and intended for resources also belonging to the same partition 6. Since, in the present example, the request signals from the CPU 16 intended for the complex management hardware resources 33 are indeed intended for these resources owned by the partition 6, and from resources owned by partition 6, the destination firewalls 28 upon consultation with their CSR 50 allow the signals to pass.

Further in the present example, each of the system memory 18 and the I/O system 20 are associated with the same partition 6 as the CPU 16, the CPU 16 is intending to communicate with these devices rather than memory or I/O devices of another partition, and the respective destination firewalls 26 and 24 existing in between the fabric 29 and the system memory 18 and I/O system 20, respectively, expect that signals arriving at those destination firewalls will indeed be destined for the partition 6 as well. Thus, in the present embodiment, the destination firewalls 26, 24 upon referring to their respective CSRs 50 also allow the request signals to pass. If on the contrary the request signals received by the destination firewalls 24, 26 were intended for another partition (e.g., the partitions 8 or 10) then the respective destination firewalls 24, 26, 28 would terminate the signals, generate appropriate error messages, and update their respective CSRs 50 with such error messages. Notwithstanding the fact that the destination firewalls 24, 26 and 28 in the present embodiment selectively permit the request packets to tunnel through (e.g., packets destined for resources of the partition 6 are allowed while others are rejected), it is possible in alternate embodiments to program the firewall to allow all request packets to pass irrespective of the destination.

For the I/O system 20 and the system memory 18, subsequent to the passing of the request signals through the respective destination firewalls 24 and 26 the request signals in turn are forwarded to the respective reverse abstraction tables 32 and 27 as indicated by arrows 66 and 90. Upon receiving the request signals from the respective destination firewalls 24 and 26, the reverse abstraction tables 32 and 27 convert the fabric addresses back into processor addresses appropriate for accessing the I/O system 20, and the system memory 18. As discussed above, the performing of these conversions typically involves consultation of the respective CSRs 50 of the destination firewalls 24 and 26. After translation by the destination firewalls 24 and 26, respectively, the respective request signals are finally provided to their respective destinations, namely, the I/O system 20, and the system memory 18, as indicated by arrows 68 and 91, respectively. The complex management hardware resources 33 continue to be addressed by the fabric address and do not require address translation by the reverse abstraction tables.

As discussed above, the computer system 2 includes both the unprotected resources 11 and the protected resources 13. While the CPU 16 (aside from the protected portion 54 of its CSR 50) is one of the unprotected resources 11, the complex management hardware resources 33 and the I/O system 20 include both the protected portions 35 and 42 respectively and the unprotected portions 31 and 44, and likewise the system memory 18 includes both the protected portions 38 and the unprotected portions 40. Consequently, while request signals sent by an unprotected application or operating system operating on the CPU 16 that are received by the unprotected portions 44, 40 of the I/O system 20 or system memory 18 will be accepted and responded to by those devices (once they themselves confirm that they are unprotected devices as indicated by their respective CSRs 50), request signals sent by the CPU 16 that are received by the protected portions 42, 38 of the I/O system 20 or system memory 18 or by the protected portions 35 of the complex management hardware resources 33, will only be accepted and responded to by those devices under certain circumstances.

More particularly, in order for the request signals from the CPU 16 to elicit a response from these protected devices 42, 38, 35 the request signals must satisfy one or more trustworthiness conditions, or satisfy a "root of trust", indicating that the CPU is in the CM mode. Depending upon the embodiment, it is possible to meet or attain the trustworthiness conditions in various ways. For example, in some circumstances, an application desiring entry to the privileged CM mode attains this status by executing a block of CM-enabled code within its partition (e.g., the partition 6) establishing that the application is a trusted source not generally available to the operating system running on the respective partition. Regardless of how the trustworthiness conditions are satisfied, upon satisfaction of those conditions the request signals become CM-enabled. As a result, when the protected devices 42, 38, 35 receive these request signals, upon determining that they themselves are protected devices based upon the information in their respective CSRs, the protected devices then accept and respond to the request signals. If however the request signals do not meet the trustworthiness conditions, the protected devices 42, 38, 35 will raise violations, deny access to the request signals and store corresponding records in their respective CSRs 50.

As further indicated by arrow 70, when the I/O system 20 decides to respond to request signals received from the CPU 16, a response signal is sent to the forward abstraction table 34 which converts the processor address of those signals into fabric address. Since the forward abstraction table 34 also serves as the source firewall, the abstraction table determines that the response signals are in fact destined to an appropriate partition (e.g., the partition 6). Assuming this to be the case, the response signals are received at the fabric 29 as indicated by the arrow 72. By comparison, responses from the system memory 18 and the complex management hardware resources 33 are sent directly from the respective devices to the fabric 29 without undergoing address translation by the forward abstraction tables, as indicated by arrows 92 and 71, respectively. The fabric 29 upon receiving any of these responses then routes the response to the destination firewalls 30 as indicated by an arrow 74. Assuming that the destination firewalls 30 confirm that the response signals are again intended for the appropriate partition (e.g., the partition 6), then the response signals are further forwarded to the reverse abstraction table 36 as indicated by an arrow 76. Finally, the reverse abstraction table 36 reconverts the fabric addresses of the response signals back into corresponding processor addresses, and the response signals are then provided back to the CPU 16 as indicated by an arrow 80, at which point the CPU can then utilize whatever information is provided by the response signals and act accordingly.

While the exemplary communication flow patterns discussed above with respect to the schematic diagram 14 of FIG. 2 are several of the possible communication flow patterns that can occur among the CPU 16, system memory 18, I/O system 20 and complex management hardware resources 33 by way of the various intermediary devices (e.g., the fabric 29, the forward abstraction tables/source firewalls 22 and 34 the destination firewalls 24, 26, 28 and 30, and the reverse abstraction tables 32, 27 and 36), it should be understood that additional communications can be initiated not only by the CPU 16 but also by any of the system memory, I/O system, and complex management hardware resources. Indeed, FIG. 2 is also intended to be representative of the sending of request signals from any of the system memory 18, I/O system 20 and complex management hardware resources 33 for transmission to any of those devices or the CPU 16, as well as related response signals. Also, it will be understood that in other embodiments the various intermediary devices will interconnect other devices other than merely the single CPU 16, system memory 18, I/O system 20 and complex management hardware resources 33 shown in FIG. 2 (for example, there can be multiple CPUs).

Additionally, while the above-described example envisions that the CPU 16, system memory 18, and I/O system 20 are all provided on the same partition (e.g. the partition 6) in other embodiments these devices can be on multiple partitions. Indeed, it is intended that the fabric 29 (and the CML 12) as indicated by FIG. 1 constitute an intermediary among all of the partitions 6-10 and the resources on those partitions. While typically the operation of the CSRs 50 on the various devices, along with the operation of the various intermediaries (particularly the source firewalls and destination firewalls) will tend to restrict communications between resources on different partitions as well as restrict communications between the unprotected and protected resources (particularly the CML 12), this need not always be the case. Rather, depending upon the how the CSRs 50 of various devices are programmed, depending upon how the intermediaries are configured (particularly the source firewalls and destination firewalls), and depending upon whether and under what circumstances unprotected resources can attain the CM mode, various levels of manners of segregation, restrictions, and protection can be achieved in different embodiments.

From the above discussion, it should be apparent that various embodiments of the present invention are advantageous in one or more regards. For example, at least some embodiments of the present invention allow multiple partitions of a computer system having multiple sets of resources to simultaneously operate in a manner that substantially avoids conflicts among the different partitions (and particularly avoids conflicts among different operating systems associated with those different partitions). Further, at least some embodiments, of the present invention allow for such multiple partitions to be operated simultaneously in a manner such that a failure within one partition will not (or will not likely) negatively impact the operation of other partition(s), and/or in manner such that a security attack upon a given partition of the computer system cannot not be easily launched from another partition of the computer system.

Additionally, depending upon the embodiment, the present invention is generally intended to encompass a variety of processes, including modifications and/or refinements of the above-described processes, allowing for dynamic management and allocation/re-allocation of resources. While embodiments of the present invention are particularly applicable to computer systems that are used as or in connection with "compute server" systems, embodiments of the present invention are also generally applicable for use in connection with any computer system having multiple partitions or regions, particularly ones that employ multiple operating systems.

The particular hardware components used to provide isolation from the operating system, protected and unprotected resources assigned to the CML and the operating system respectively, routing and mapping tables employed by the fabric and the forward and reverse abstraction tables and source and destination firewalls and other features can all be varied depending upon the type/needs of the computer system being used and the applications running on those computer systems. Further, it will be understood that any usage of the term "protected" or "unprotected" herein is not intended to indicate that such device or process necessarily guarantees any particular level of protection or isolation. Rather, the particular levels of protection, restriction, isolation or segregation achieved in various embodiments of the present invention will depend upon the particular features and characteristics of the those embodiments, as well as how those embodiments are implemented and used in practice. Additionally, it can be envisioned that the present invention can be extended to include embodiments having multiple partitions hosted by the CPU in which a source firewall exists, where the source firewall routes packets to valid destinations based on not only the address space but also based on the partition. Likewise, multiple partitions can be hosted by the I/O system, where a source firewall routes packets to valid destinations based on not only the address space but also based on the partition.

It is specifically intended that the present invention not be limited to the embodiments and illustrations contained herein, but include modified forms of those embodiments including portions of the embodiments and combinations of elements of different embodiments as come within the scope of the following claims.

We claim:

1. A computer system comprising:
a plurality of partitions having respective operating systems;
a layer to communicate with each of the plurality of partitions;
unprotected resources including processing devices and dynamically assignable to the plurality of partitions, where a portion of the unprotected resources is reassignable from one of the partitions to another of the partitions; and
protected resources accessible by the layer but configured to not provide a useful response to the operating systems, and where the protected resources include dedicated resources assigned to the layer that are invisible to the operating systems, and
wherein the protected resources are arranged to restrict communications between the partitions, the protected resources including an address conversion resource to convert between addresses in a first address space and addresses in a second address space, and a firewall to accept or reject communications between the partitions, wherein the firewall is to determine whether a request from a requester in a first of the partitions is allowed to access a resource in a second of the partitions, the firewall to allow the request to access the resource in the second partition under a first condition, and to not allow the request to access the resource in the second partition under a second condition.

2. The computer system of claim 1, wherein the layer has access to the unprotected resources of the partitions.

3. The computer system of claim 1, further comprising system memory having first segments that are part of the unprotected resources, and second segments that are part of the protected resources.

4. The computer system of claim 1, further comprising an input/output (I/O) system having I/O devices that are part of the unprotected resources, and I/O devices that are part of the protected resources.

5. The computer system of claim 1, further comprising a fabric that is part of the protected resources, wherein the protected and unprotected resources are to communicate using the fabric.

6. The computer system of claim 1, wherein the dedicated resources include a dedicated management processor to execute code of the layer.

7. The computer system of claim 1,
wherein the layer is to dynamically reassign the portion of the unprotected resources from the first partition to the second partition.

8. A method comprising:
providing, in a computer system a plurality of partitions having respective operating systems;
communicating, by a layer, with the plurality of partitions;
dynamically assigning unprotected resources including processing devices to the plurality of partitions, where a portion of the unprotected resources is reassignable from one of the partitions to another of the partitions;
accessing, by the layer, protected resources, where the protected resources are configured to not provide a useful response to the operating systems, and where the protected resources include dedicated resources assigned to the layer that are invisible to the operating systems; and
using the protected resources to restrict communications between the partitions, where the protected resources include an address conversion resource to convert between addresses in a first address space and addresses in a second address space, and a firewall to accept or reject communications between the partitions, wherein the firewall is to determine whether a request from a requester in a first of the partitions is allowed to access a resource in a second of the partitions, the firewall to allow the request to access the resource in the second partition under a first condition, and to not allow the request to access the resource in the second partition under a second condition.

9. The method of claim 8, further comprising providing a system memory having first segments that are part of the unprotected resources, and second segments that are part of the protected resources.

10. The method of claim 8, further comprising providing an input/output (I/O) system having I/O devices that are part of the unprotected resources, and I/O devices that are part of the protected resources.

11. The method of claim 8, further comprising performing communications among the protected and unprotected resources using a fabric that is part of the protected resources.

12. The method of claim 8, where the dedicated resources include a dedicated management processor to execute code of the layer.

13. The method of claim 8,
wherein the dynamically assigning the unprotected resources comprises dynamically assigning the unprotected resources in the computer system.

14. The method of claim 8,
further comprising dynamically assigning the portion of the unprotected resources from the first partition to the second partition.

* * * * *

UNITED STATES PATENT AND TRADEMARK OFFICE
CERTIFICATE OF CORRECTION

| | |
|---|---|
| PATENT NO. | : 8,782,779 B2 |
| APPLICATION NO. | : 11/862002 |
| DATED | : July 15, 2014 |
| INVENTOR(S) | : Giles et al. |

It is certified that error appears in the above-identified patent and that said Letters Patent is hereby corrected as shown below:

In the Claims

Column 18, line 41, Claim 8, delete "system" and insert -- system, --, therefor.

Signed and Sealed this
Eleventh Day of November, 2014

Michelle K. Lee
*Deputy Director of the United States Patent and Trademark Office*